Oct. 13, 1925.  
E. B. KARN ET AL  
FISHING TOOL  
Original Filed April 18, 1922    3 Sheets-Sheet 3
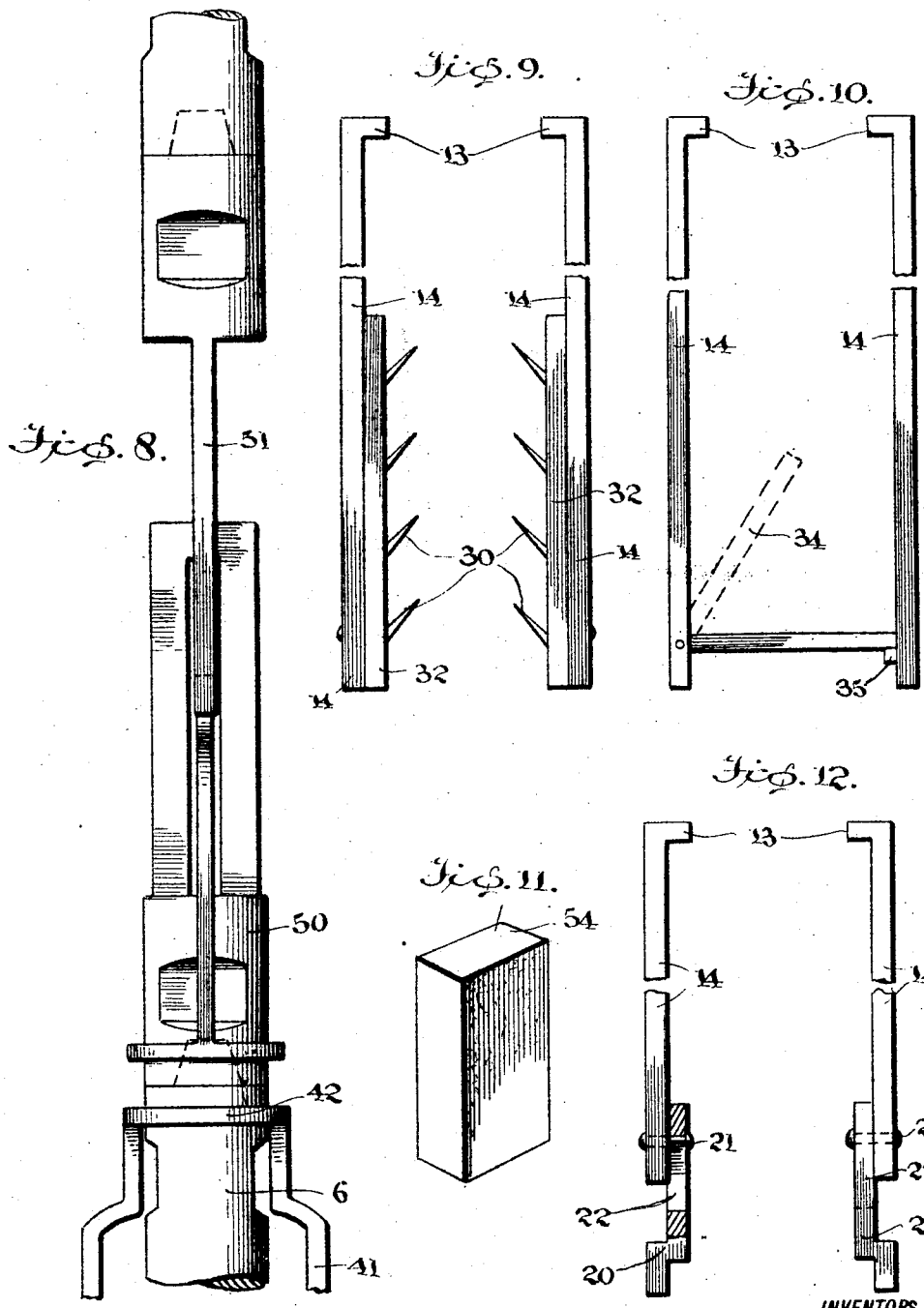

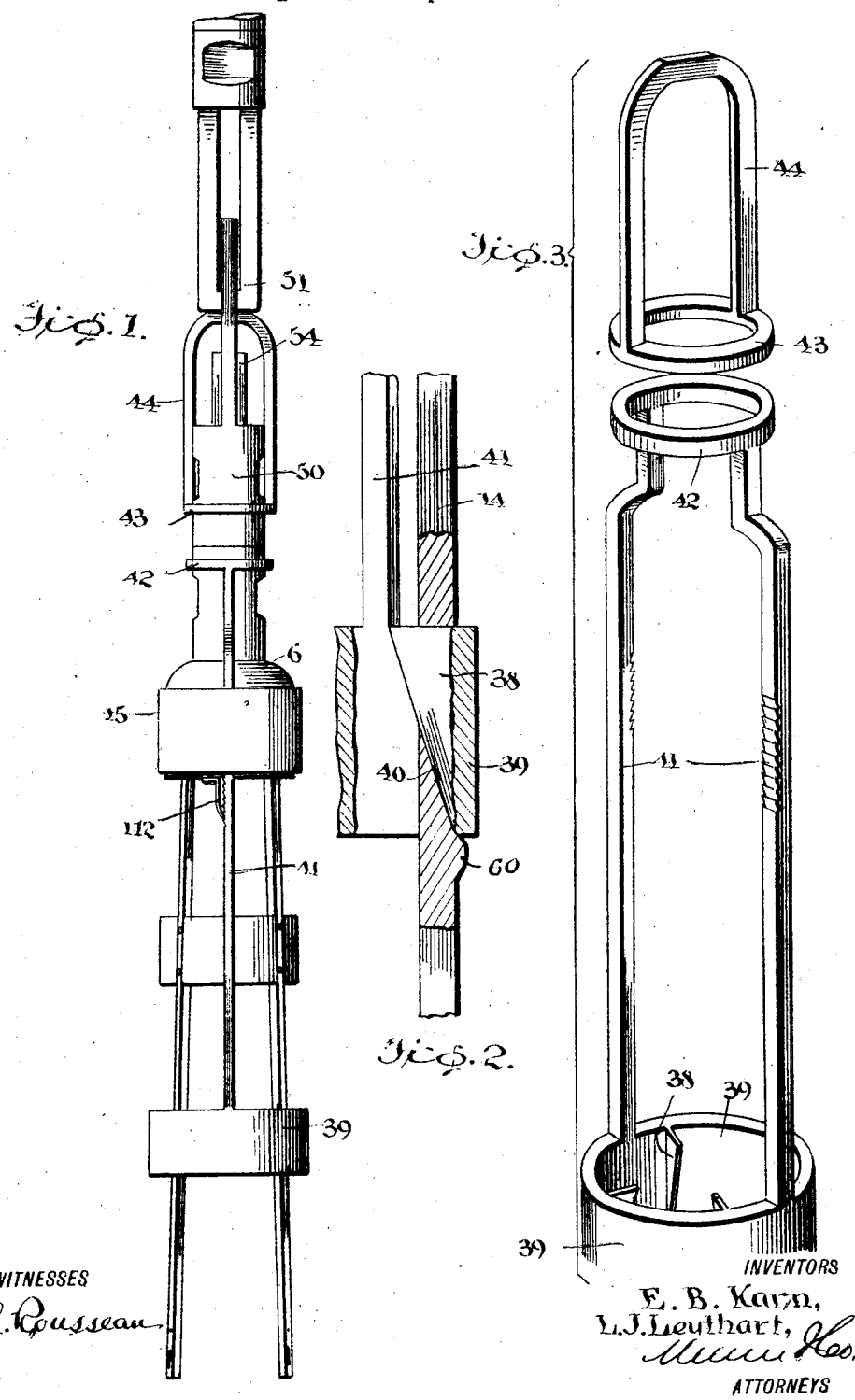

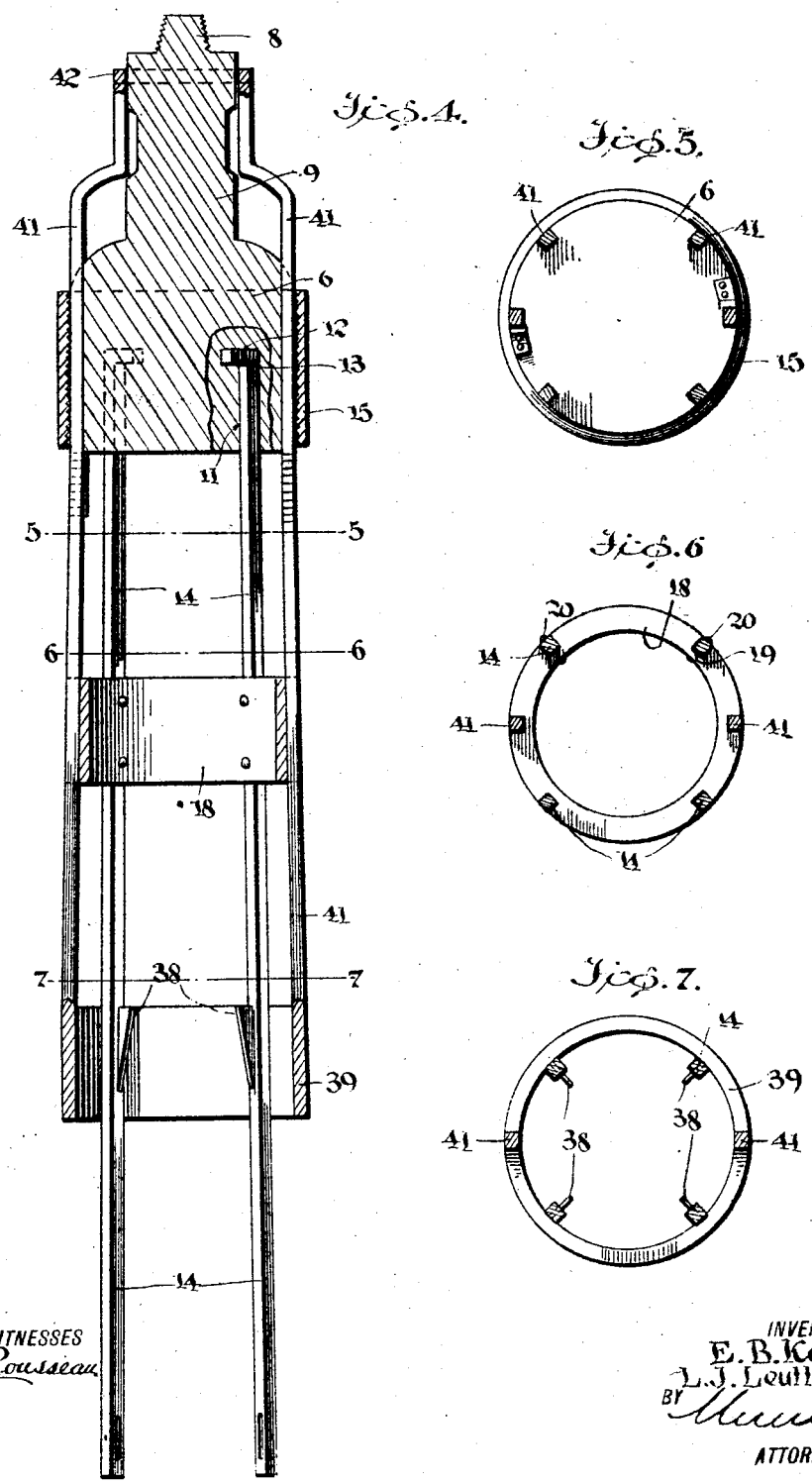

Patented Oct. 13, 1925.

1,556,692

UNITED STATES PATENT OFFICE.

EDWIN B. KARN AND LAWRENCE J. LEUTHART, OF OSAGE, WYOMING.

FISHING TOOL.

Application filed April 18, 1922, Serial No. 554,847. Renewed March 30, 1925.

*To all whom it may concern:*

Be it known that we, EDWIN B. KARN and LAWRENCE J. LEUTHART, citizens of the United States, and residents of Osage, in the county of Weston and State of Wyoming, have invented certain new and useful Improvements in Fishing Tools, of which the following is a specification.

This invention relates to fishing tools especially adapted for use in oil and other wells.

Briefly stated an important object of this invention is to provide a fishing tool having means whereby the jaws of the same may be moved inwardly into engagement with a broken underreamer lug or the like and which is provided with means whereby a jar cannot operate the jaws during the downward movement of the fishing tool. That is to say the cavings in the well resist the downward movement of the tool to some extent and this resistance offered to progress of the tool cannot cause the jars to urge the jaws inwardly before the tool reaches the object to be removed.

A further object of the invention is to provide a fishing tool having simple means whereby the same may be employed to remove cordage and sand buckets having bails.

Also the invention is provided with a simple means whereby the fishing tool may be utilized to straighten objects and subsequently remove the same.

A further object is to provide a well fishing tool which is of highly simplified construction, reliable in use and cheap to manufacture.

Other objects and advantages of the invention will be apparent during the course of the following description.

In the accompanying drawing, forming a part of this application and in which like numerals are employed to designate like parts throughout the same, Figure 1 is a side elevation of the improved fishing tool.

Figure 2 is a detail view illustrating one of the cams for moving the associated jaw inwardly.

Figure 3 is a group perspective of the means for moving the arms or jaws inwardly.

Figure 4 is an enlarged sectional view through the tool.

Figure 5 is a horizontal sectional view taken on line 5—5 of Figure 4.

Figure 6 is a horizontal sectional view taken on line 6—6 of Figure 4.

Figure 7 is a horizontal sectional view taken on line 7—7 of Figure 4.

Figure 8 is an enlarged view of a jar embodied in the invention, the same being shown in connection with a portion of the fishing tool and the jaw operating means.

Figure 9 is a fragmentary side elevation of a pair of the arms or jaws equipped with teeth for engaging cordage.

Figure 10 is a fragmentary side elevation of a pair of arms for removing a sand bucket or other article provided with a bail.

Figure 11 is a perspective of a frangible retainer or spacing element adapted to hold the sections of the jar against movement with relation to each other when the fishing tool is being lowered into the well.

Figure 12 is an enlarged fragmentary side elevation of a pair of the arms provided with means for straightening the objects to be removed.

In the drawing wherein for the purpose of illustration is shown a preferred embodiment of the invention the numeral 6 generally designates a head having its rear portion provided with an attaching stem 8, the head being provided between the attaching stem 8 and itself with a shank 9.

The head 6 is provided with a plurality of longitudinally extending grooves 11 which terminate in inwardly directed sockets 12 adapted for the reception of the inwardly directed attaching lugs 13 of arms 14. As illustrated in Figure 4 a collar 15 is threaded on the head 6 and surrounds the rear portions of the arms 14 whereby to securely and positively hold the same in the grooves 11 and the sockets 12. However, when desired, the sleeve 15 may be readily and conveniently removed for changing the arms 14 or renewing the same.

As illustrated in Figure 4 the arms 14 extend a substantial distance beyond the head 6 in substantially parallel relation and are connected in advance of the head and at a point spaced rearwardly from their forward ends by means of a connecting block 18 which as illustrated in Figure 6 is provided with a plurality of longitudinal grooves 19 for the reception of the intermediate portions of the arms 14. Fastening devices in the nature of bolts 20 permanently connect the arms to the block 18.

The forward portions of the arms 14 are provided with suitable means for gripping a lost underreamer lug or other lost article and when the arms are moved inwardly by a means to be fully hereinafter described, the article is securely gripped.

As illustrated in Figure 12 extension arms 20 may be slidably connected to the forward portions of certain of the arms by means of pins 21 connected to the arms and slidable through slots 22 in the extension arms. The forward portions of the extension arms 20 are offset so that the terminal portions of the arms 20 are disposed in the planes of the arms 14. The extension arms 20 are employed when the lost article does not lay flat in the bottom of the well and in that case certain of the extension arms are allowed to advance while the other extension arms possibly assume a rearward position. By reason of this construction, all of the arms are caused to contact with various parts of the article to be regained and when the arms are moved inwardly the object will be securely gripped. In the use of the extension arms the same will straighten the article to be removed and the casing will hold the article in this position while the arms 14 are made ready to grip the article.

When it is desired to regain cordage or the like, the arms 14 may be provided with upwardly directed prongs 30 having attaching plates 32 secured to the inner portions of the arms 14. It will be seen that when it is desired to regain cordage it is merely necessary to lower the prongs 30 into the well and the same will be engaged with the cordage so that the subsequent upward movement of the device will result in extracting the cordage.

The arms 14 may be provided with a pivoted latch 34 and a lug 35 which serves to limit the downward movement of the latch. The latch 34 and the lug 35 are employed when it is desired to remove a sand bucket or other article provided with a bail. When the latch 34, the lug 35 and the arms 14 are lowered into the well the latch 34 will be engaged with the bail of the sand bucket and the removal of the sand bucket is thereby made possible.

The arms 14 of which there may be any desired number are moved inwardly by the triangular cams 38 extending longitudinally on the inner side of the cam sleeve 39. As illustrated in Figure 2, the triangular cams 38 are operable in slots 40 so that when the cams are moved downwardly the inclined edges of the same will contact with the lower ends of the slots 40 and move the arms 14 inwardly.

As illustrated in the Figure 3 the cam sleeve 39 has connection with a pair of rods 41 which are in turn connected at their rear ends to an annular head 42 slidably surrounding the head 9 of the fishing tool.

The head or annulus 42 is actuated by the contact rim 43 on the forward end of a substantially U-shaped yoke 44. The U-shaped yoke 44 when advanced, advances the contact rim 43 and thereby advances the sleeve 39 so that the arms 14 are moved inwardly.

In carrying out the invention the yoke 44 is slidably connected to the forward section 50 of the usual jar and the rear end of the yoke is engaged by the rear section 51 of the jar. When the device is being lowered into the well, a breakable block 54 is arranged between the rear end of the yoke and the forward jar so as to prevent excessive movement of the sections. That is to say, the rear section of the jar cannot advance and advance the yoke 44 for a substantial distance. By thus preventing the yoke 44 from advancing during the downward movement of the tool the sleeve 39 is held in its retracted position.

In operation the tool is positioned as illustrated in Figure 1 and is lowered into the well. The breakable spacing block 54 prevents the jar from actuating the yoke and consequently the arms 14 are allowed to remain in spaced relation. However, when the device reaches the limit of its downward movement the block 54 may be broken by the rear section of the jar and the sleeve 39 advanced so as to move the arms inwardly into gripping engagement with the objects to be removed.

As illustrated in Figure 2 the arms 14 may be provided directly beneath the slots 40 with knobs 60 arranged in the path of travel of the triangular cams so that when the triangular cams are moved downwardly an increased movement of the arms 14 is had. In carrying out the invention the rods 41 are slidable through grooves in the spacing block 18 and the head 6 and are guided thereby and also by the sleeve 15. As illustrated in Figure 1, the head 6 is provided with downwardly directed pawls 112 which contact with teeth formed on the inner sides of the arms 41. The pawls 112 form a reliable means for securely and positively holding the arms 41 and the annulus 39 in their advanced positions so that the accidental disconnection of the object being removed is positively prevented.

Figure 2 illustrates that the inner wall or what might be said to be the bottom wall of the slot 40 is inclined to correspond to the inclination of the head of the cam 38 so that the arms will be moved inwardly the proper distance when the member 39 is advanced.

Having thus described the invention, what we claim is:—

1. A fishing tool comprising a head, a plurality of forwardly directed arms secured thereto and having gripping means, a sleeve surrounding said arms and having inwardly directed cams engaging the arms and adapted for moving the same inwardly, and means whereby to advance the sleeve, said arms being provided with slots having inclined walls engaging the edges of said cams.

2. A fishing tool comprising a head, a plurality of forwardly directed arms secured thereto and having gripping means, a sleeve surrounding said arms and having inwardly directed cams engaging the arms and adapted for moving the same inwardly, means whereby to advance the sleeve, and a spacing block secured to said arms intermediate the ends thereof in advance of said head.

3. A fishing tool comprising a head, a plurality of arms carried thereby and extended for a substantial distance in advance of the head, said arms being provided with a sleeve surrounding the same in advance of the head, and having inwardly directed cams, said arms being provided with slots receiving said cams, rods connected to said sleeve, a contact rim secured to the rear ends of said rods, and a yoke normally arranged in spaced relation to said contact rim and adapted for advancing the same.

4. A fishing tool comprising a head, a plurality of arms carried thereby and extended for a substantial distance in advance of the head, said arms being provided with a sleeve surrounding the same in advance of the head, and having inwardly directed triangular cams, said arms being provided with slots receiving said cams, rods connected to said sleeve, a contact rim secured to the rear ends of said rods, a yoke normally arranged in spaced relation to said contact rim and adapted for advancing the same, and means whereby to advance said yoke into contact with said rim.

5. A fishing tool comprising a head, a plurality of arms carried thereby and extended for a substantial distance in advance of the head, said arms being provided with a sleeve surrounding the same in advance of the head, and having inwardly directed triangular cams, said arms being provided with slots receiving said cams, rods connected to said sleeve, a contact rim secured to the rear ends of said rods, a yoke normally arranged in spaced relation to said contact rim and adapted for advancing the same, means whereby to advance said yoke into contact with said rim, and a spacing block arranged between said sleeve and said head and connected to said arms, said spacing block being provided with grooves receiving said rods.

6. A fishing tool comprising a head, a plurality of arms carried thereby and extended for a substantial distance in advance of the head, said arms being provided with a sleeve surrounding the same in advance of the head, and having inwardly directed triangular cams, said arms being provided with slots receiving said cams, rods connected to said sleeve, a contact rim secured to the rear ends of said rods, a yoke normally arranged in spaced relation to said contact rim and adapted for advancing the same, means whereby to advance said yoke into contact with said rim, a spacing block arranged between said sleeve and said head and connected to said arms, said spacing block being provided with grooves receiving said rods, and means whereby to hold the rods in a set position.

7. A fishing tool for oil wells comprising a head having a plurality of longitudinal grooves and sockets communicating with the grooves, arms received in said grooves and having inwardly directed terminal portions received in said sockets, a sleeve threaded on said head and holding said arms in position, cams associated with said arms, rearwardly directed rods having connection with said cams, said head being provided with grooves receiving said rods, the rear ends of said rods being provided with a contact annulus, a U-shaped yoke having its forward end provided with a contact annulus adapted to engage said first named contact annulus whereby to advance said cams, and a sectional jar secured to said head and having means whereby to normally hold said first and second named contact annuli in spaced relation.

8. A fishing tool comprising a head, a plurality of arms connected to the head, a sleeve surrounding said arms and having means to urge the same inwardly, said sleeve having rearwardly directed rods provided with a contact member adapted to be moved forwardly to advance the sleeve and move the arms inwardly, and a latching mechanism to detachably hold the sleeve in its advanced position whereby to hold the arms in engagement with an object to be recovered.

9. A fishing tool comprising a head, a plurality of arms connected to the head, a sleeve surrounding said arms and having means to urge the same inwardly, said sleeve having rearwardly directed rods provided with a contact member adapted to be moved forwardly to advance the sleeve and move the arms inwardly, a latching mechanism to detachably hold the sleeve in its advanced position whereby to hold the arms in engagement with an object to be recovered, and a holding member surrounding said head for holding said arms in position and for guiding said rod.

EDWIN B. KARN.
LAWRENCE J. LEUTHART.